United States Patent
Kikuta et al.

(10) Patent No.: US 12,264,760 B2
(45) Date of Patent: Apr. 1, 2025

(54) EXPANSION JOINT AND INCINERATION ASH TREATMENT EQUIPMENT

(71) Applicant: KAWASAKI JUKOGYO KABUSHIKI KAISHA, Kobe (JP)

(72) Inventors: Munehiro Kikuta, Kobe (JP); Kazuya Tamaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 243 days.

(21) Appl. No.: 17/912,401

(22) PCT Filed: Mar. 11, 2021

(86) PCT No.: PCT/JP2021/009751
§ 371 (c)(1),
(2) Date: Sep. 16, 2022

(87) PCT Pub. No.: WO2021/187303
PCT Pub. Date: Sep. 23, 2021

(65) Prior Publication Data
US 2023/0138080 A1     May 4, 2023

(30) Foreign Application Priority Data
Mar. 16, 2020    (JP) ................................ 2020-045284

(51) Int. Cl.
*F16L 27/12*      (2006.01)
*B02C 23/02*      (2006.01)
(Continued)

(52) U.S. Cl.
CPC .............. *F16L 27/12* (2013.01); *B02C 23/02* (2013.01); *F23J 3/06* (2013.01); *B02C 17/14* (2013.01); *F23J 2700/003* (2013.01)

(58) Field of Classification Search
CPC .......... F16L 51/00; F16L 27/12; F16L 23/032
See application file for complete search history.

(56) References Cited

U.S. PATENT DOCUMENTS 686,598 A * 11/1901 Evans ...................... F16L 51/00
                                                             277/621
1,076,738 A * 10/1913 Berry ...................... F16L 27/12
                                                             285/224

(Continued)

FOREIGN PATENT DOCUMENTS

| CN | 104976462 A | * | 10/2015 | .............. F16L 27/12 |
| CN | 108131524 A | * | 6/2018 | .............. F16L 27/12 |

(Continued)

*Primary Examiner* — Matthew Troutman
*Assistant Examiner* — Fannie Kee
(74) *Attorney, Agent, or Firm* — Oliff PLC

(57) ABSTRACT

An expansion joint includes: an outer tube including first and second ends and extending therebetween, the outer tube including first and second flanges, the first being located at the first end, the second being located at the second end and connectable to a downstream pipe; an inner tube including third and fourth ends and extending therebetween, the inner tube being located inside the outer and including third and middle flanges, the third flange being located at the third end and connectable to the upstream pipe, the middle flange being located at a middle portion between the third and fourth ends; and a closure including an outer peripheral portion connected to the first flange, an inner peripheral portion connected to the middle flange, and an elastic portion connecting the outer and inner peripheral portions. The first end is spaced from the third and located between the third and fourth ends.

6 Claims, 10 Drawing Sheets

(51) Int. Cl.
*F23J 3/06* (2006.01)
*B02C 17/14* (2006.01)

(56) References Cited

U.S. PATENT DOCUMENTS

| | | | | |
|---|---|---|---|---|
| 3,469,862 | A * | 9/1969 | Conibeer | F16L 27/12 |
| | | | | 174/12 R |
| 4,251,354 | A * | 2/1981 | Lower | F16L 27/12 |
| | | | | 209/371 |
| 4,383,693 | A * | 5/1983 | Heller | F16L 51/00 |
| | | | | 277/606 |
| 5,259,511 | A * | 11/1993 | Pierson | F16L 27/12 |
| | | | | 138/120 |
| 5,887,726 | A * | 3/1999 | Mitchell | F16L 27/12 |
| | | | | 209/243 |
| 2020/0386353 | A1 | 12/2020 | Tsunemori et al. | |

FOREIGN PATENT DOCUMENTS

| | | | |
|---|---|---|---|
| JP | 2018-173117 A | 11/2018 | |
| KR | 101970172 B1 * | 4/2019 | F16L 27/12 |

* cited by examiner

EXPANSION JOINT AND INCINERATION ASH TREATMENT EQUIPMENT

CROSS-REFERENCE TO RELATED APPLICATIONS

This is a National Phase of International Application No. PCT/JP2021/009751 filed Mar. 11, 2021, which claims the benefit of Japanese Application No. 2020-045284 filed Mar. 16, 2020. The disclosure of the prior applications is hereby incorporated by reference herein in its entirety.

TECHNICAL FIELD

The present disclosure relates to expansion joints in piping systems through which powdery or granular materials are transferred and in particular to an expansion joint that is located at a point of connection of pipes in a region where a powdery or granular material is transferred by gravity and that absorbs displacement between the connected pipes. The present disclosure also relates to incineration ash treatment equipment including the expansion pipe.

BACKGROUND ART

Conventionally, there is known an expansion joint included in equipment for treatment of powdery or granular materials and used at a connection point where displacement between connected parts occurs, such as at a point of connection between a vibrator and a pipe. The present applicant has proposed such a kind of expansion joint in Patent Literature 1.

The expansion joint of Patent Literature 1 includes an outer tube, an inner tube located inside the outer tube, and an elastic closure (bellows) closing a gap between the upstream ends of the inner and outer tubes. The downstream end of the outer tube is connected to a downstream pipe, and the upstream end of the inner tube is connected to an upstream pipe. The upstream ends of the inner and outer tubes are located at substantially the same height. In the expansion joint of Patent Literature 1, the downstream end of the inner tube and the closure are far enough from each other to prevent contact between the closure and a hot transferred material getting in between the inner and outer tubes.

CITATION LIST

Patent Literature

PTL 1: Japanese Laid-Open Patent Application Publication No. 2018-173117

SUMMARY OF INVENTION

Technical Problem

Expansion joints are inserted between upstream and downstream pipes placed beforehand. Expansion joints are heavy, and may be located at great heights or in narrow places. With the use of the expansion joint of Patent Literature 1 in such a situation, the expansion joint mounting work including connecting the inner tube to the upstream pipe and attaching the closure could be cumbersome because the upstream end of the outer tube, the upstream end of the inner tube, and the downstream end of the upstream pipe are located at substantially the same height.

The present disclosure has been made in view of the above circumstances, and an object of the present disclosure is to propose an expansion joint in which the downstream end of an inner tube and a closure are far enough from each other and which can easily be mounted and removed.

Solution to Problem

An expansion joint according to one aspect of the present disclosure is an expansion joint that absorbs displacement occurring at a point of connection between upstream and downstream pipes through which a powdery and/or granular material is transferred by gravity, the expansion joint including:

an outer tube including opposite first and second ends and extending from the first end to the second end in an axial direction of the expansion joint, the outer tube further including a first flange and a second flange, the first flange being located at the first end, the second flange being located at the second end and connectable to the downstream pipe;

an inner tube including opposite third and fourth ends and extending from the third end to the fourth end in the axial direction, the inner tube being located inside the outer tube and further including a third flange and a middle flange, the third flange being located at the third end and connectable to the upstream pipe, the middle flange being located at a middle portion between the third and fourth ends; and a closure including an outer peripheral portion connected to the first flange, an inner peripheral portion connected to the middle flange, and an elastic portion connecting the outer peripheral portion to the inner peripheral portion, wherein the first end is spaced from the third end in the axial direction and located between the third and fourth ends in the axial direction.

Incineration ash treatment equipment according to one aspect of the present disclosure includes: a vibrator that treats incineration ash; a pipe that delivers the incineration ash to the vibrator; and the expansion joint as defined above, the expansion joint being located between an outlet of the pipe and an inlet of the vibrator.

In the expansion joint and incineration ash treatment equipment configured as described above, the middle flange, to which the closure is attached, is spaced from the fourth end (i.e., downstream end) of the inner tube in the axial direction. Thus, the fourth end of the inner tube and the closure can be spaced a distance corresponding to the distance between the fourth end and middle flange of the inner tube in the axial direction. This can reduce the likelihood that the transferred material entering the gap between the inner tube and the outer tube from the fourth end of the inner tube comes into contact with the closure 4.

In the expansion joint and incineration ash treatment equipment configured as described above, the first flange located at the first end of the outer tube and the third flange located at the third end of the inner tube are spaced from each other in the axial direction. The space between the first flange and the third flange in the axial direction can be used as a workspace for connection (or disconnection) of the third flange and the upstream pipe. Thus, connection and disconnection of the expansion joint and the upstream pipe can easily be performed.

In the expansion joint and incineration ash treatment equipment configured as described above, the third end of the inner tube connected to the upstream pipe and the first end of the outer tube are spaced from each other in the axial direction. Thus, the dimension of the outer tube in the axial direction is smaller than the vertical dimension of a mounting region extending between the upstream pipe and the downstream pipe. As such, the outer tube with the inner tube inserted therein can easily be carried into the mounting region. After the inner tube and the outer tube are placed in the mounting region, the closure can be carried into the mounting region by utilizing a gap between the upstream pipe and the outer tube. Additionally, the space between the third flange and the middle flange in the axial direction can be used as a workspace for attachment (or detachment) of the closure. Thus, attachment and detachment of the closure are easy.

Advantageous Effects of Invention

The present disclosure can propose an expansion joint in which the downstream end of an inner tube and a closure are far enough from each other and which can easily be mounted and removed.

DESCRIPTION OF EMBODIMENTS

Figure 1:
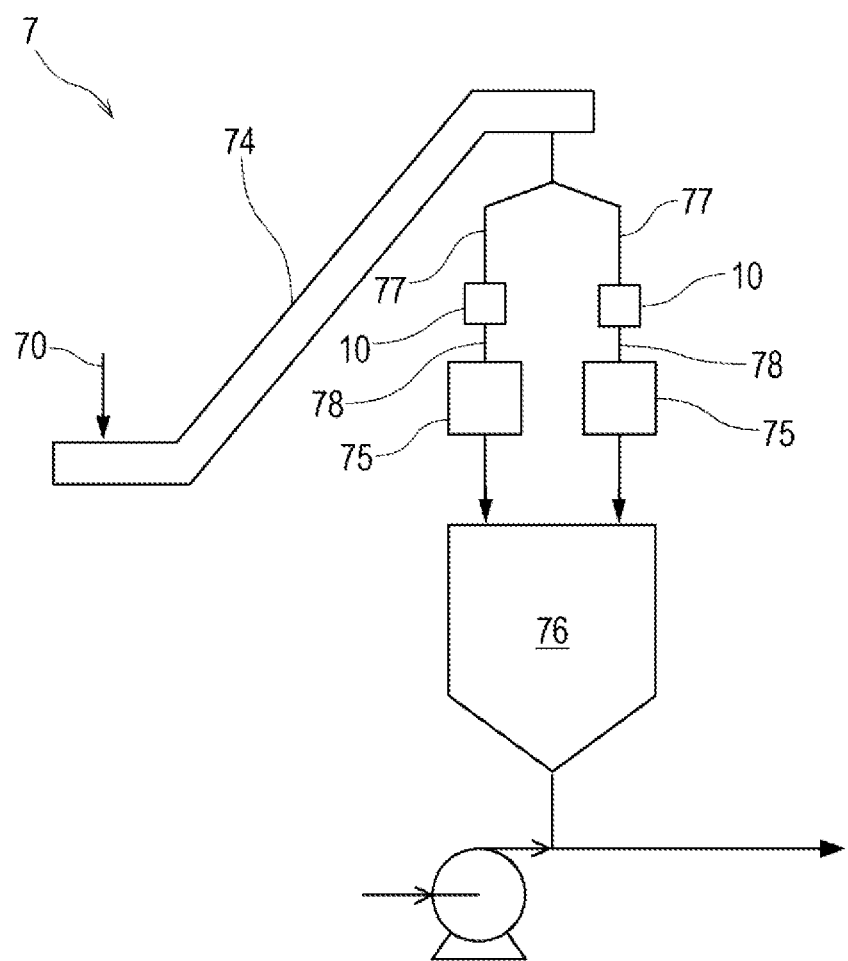
FIG. 1 shows a schematic configuration of incineration ash treatment equipment including an expansion joint according to an exemplary embodiment of the present disclosure.

Hereinafter, exemplary embodiments of the present disclosure will be described with reference to the drawings. FIG. 1 shows a schematic configuration of incineration ash treatment equipment 7 including an expansion joint 10 according to an exemplary embodiment of the present disclosure. The incineration ash treatment equipment 7 is adapted to finely grind incineration ash generated, for example, in a coal-fired boiler or garbage incinerator.

The incineration ash treatment equipment 7 of FIG. 1 includes a grinder 75 that finely grinds incineration ash 70, a conveyor 74 that transfers the incineration ash 70 to the grinder 75, and a hopper 76 that receives the incineration ash 70 ground by the grinder 75. A vibrating mill can be used as the grinder 75. In a typical vibrating mill, a grinding medium and a material to be ground collides with each other in a rapidly vibrating drum, and thus the material is finely ground.

The conveyor 74 and the grinder 75 are connected by a piping system through which the incineration ash 70 in the form of grains or aggregates is transferred. The piping system includes a vibrating pipe 78 coupled to the inlet of the grinder 75, a fixed pipe 77 located upstream of the vibrating pipe 78, and an expansion joint 10 connecting the fixed pipe 77 to the vibrating pipe 78. The terms "upstream" and "downstream", as used in the specification and the appended claims, respectively refer to upstream and downstream in the direction of flow of the material (incineration ash 70) transferred through the piping system. The fixed pipe 77 is an "upstream pipe" for the expansion joint 10, and the vibrating pipe 78 is a "downstream pipe" for the expansion joint 10.

The fixed pipe 77 is fixed relative to a structure including a device upstream of the grinder 75 (the device is, for example, the conveyor 74 or an unshown device used for another coal treatment process). The vibrating pipe 78 vibrates in conjunction with vibration of the drum of the grinder 75. Thus, displacement occurs at a point of connection between the fixed pipe 77 and the vibrating pipe 78 due to the vibration of the vibrating pipe 78. The expansion joint 10 absorbs the displacement occurring at the point of connection between the fixed pipe 77 and the vibrating pipe 78. The expansion joint 10 according to the present disclosure is applicable also in the case where both the fixed pipe 77 and the vibrating pipe 78 are movable.

[Structure of Expansion Joint 10]

Figure 2:
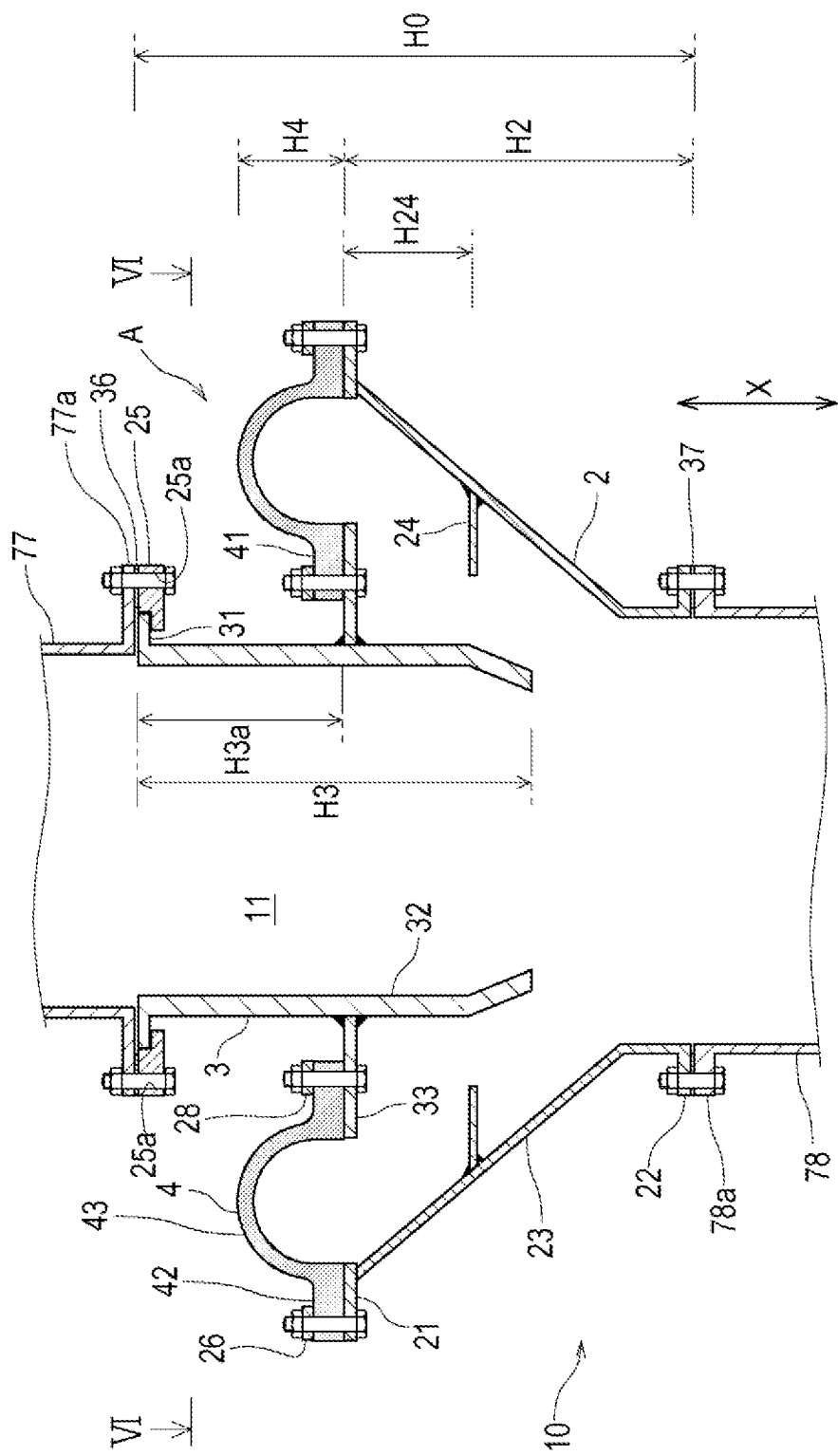
FIG. 2 shows the expansion joint according to the exemplary embodiment of the present disclosure and is an end view of the expansion joint cut along a plane including the central axis of the expansion joint.

Hereinafter, the expansion joint 10 will be described in detail. FIG. 2 shows the expansion joint 10 according to an exemplary embodiment of the present disclosure and is an end view of the expansion joint 10 cut along a plane including the central axis of the expansion joint 10. The expansion joint 10 is generally shaped as a solid of revolution. The direction in which the axis of revolution extends is referred to as the "axial direction X" of the expansion joint 10, and the axis of revolution is referred to as the "central axis" of the expansion joint 10. The expansion joint 10 is mounted in a space between the fixed pipe 77 and the vibrating pipe 78 in the up-down direction. The space between the fixed pipe 77 and the vibrating pipe 78 in the up-down direction will be referred to as a "mounting region A" hereinafter. When the vibrating pipe 78 is at rest, a straight line drawn between the center of the opening of the fixed pipe 77 and the center of the opening of the vibrating pipe 78 is parallel to the axial direction X of the expansion joint 10.

The expansion joint 10 of FIG. 2 includes an outer tube 2, an inner tube 3 located inside the outer tube 2, and a closure 4 closing a gap between the outer tube 2 and the inner tube 3. The inner circumference of the inner tube 3 defines a transfer path 11 along which the transferred material (e.g., the incineration ash 70) flows through the expansion joint 10.

Figure 3:
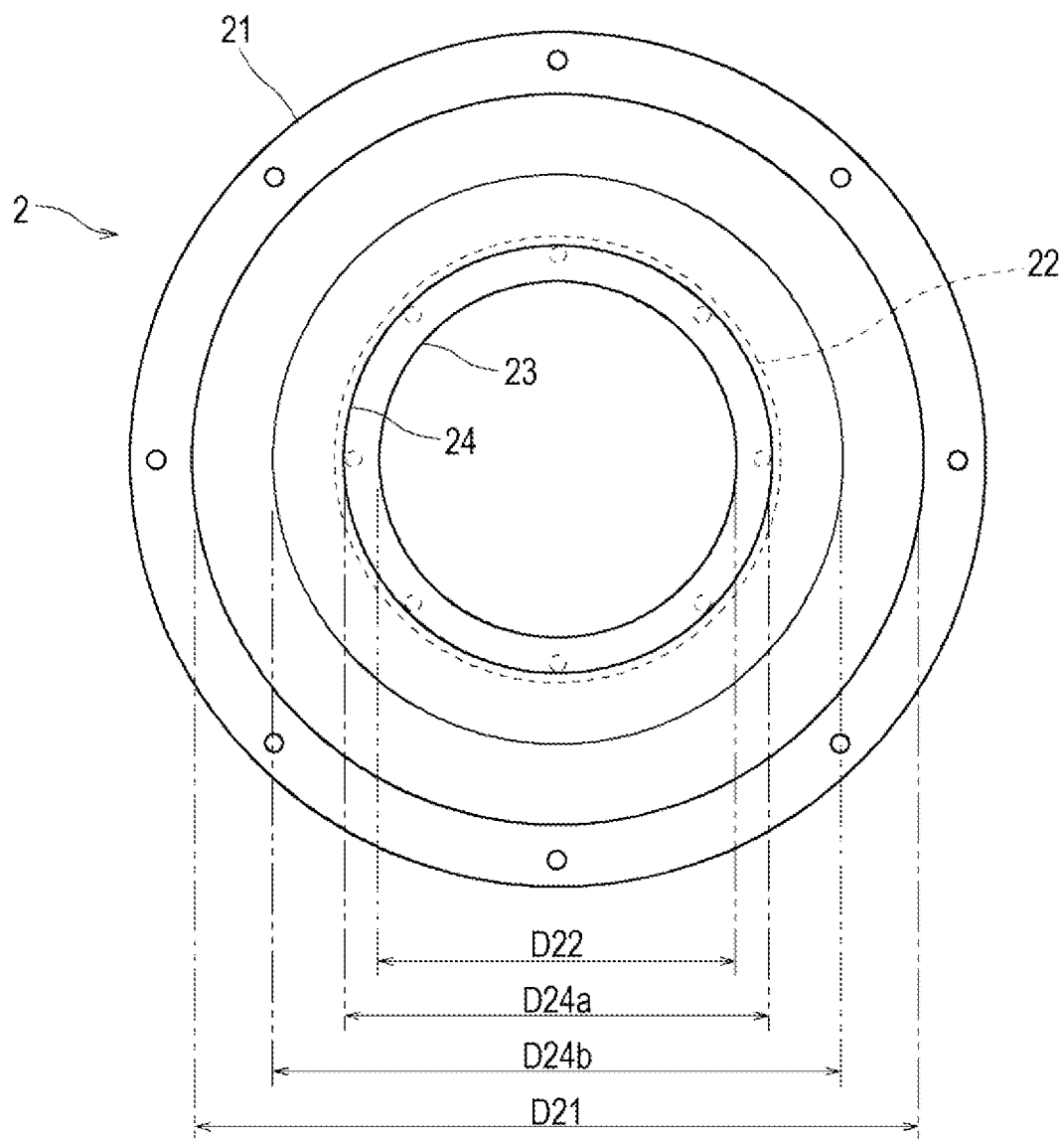
FIG. 3 shows an outer tube as viewed in the axial direction.

FIG. 3 shows the outer tube 2 as viewed in the axial direction X. As shown in FIGS. 2 and 3, the outer tube 2 is a metallic tubular body extending from its upstream end (first end) to its downstream end (second end) in the axial direction X. The outer tube 2 includes a first flange 21 located at the upstream end of the outer tube 2, a second flange 22 located at the downstream end of the outer tube 2, a barrel 23 connecting the first flange 21 to the second flange 22, and a baffle plate 24 located on the inner circumference of the barrel 23. Each of the first and second flanges 21 and 22 includes circumferentially arranged insertion holes. Bolts are inserted into the insertion holes.

The second flange 22 is connected to an inlet flange 78a located at the upstream end of the vibrating pipe 78. Between the second flange 22 and the inlet flange 78a there is a lower gasket 37 that provides hermeticity. The outer tube 2 vibrates in conjunction with vibration of the vibrating pipe 78.

The inner diameter D21 of the first flange 21 is greater than the inner diameter D22 of the second flange 22. The barrel 23 is tapered downward to smoothly connect the first and second flanges 21 and 22 having different inner diameters. The outer tube 2 structured as described above can ensure a range over which the outer tube 2 is displaceable relative to the inner tube 3 in a direction perpendicular to the axial direction X and at the same time allow for quick movement or transfer of the material from the outer tube 2 to the vibrating pipe 78.

The baffle plate 24 serves to prevent the transferred material accumulated in the transfer path 11 of the expansion joint 10 from entering the gap between the outer tube 2 and the inner tube 3. The baffle plate 24 is shaped as an annular disc and located at approximately the center of the barrel 23 in the axial direction X. The inner diameter D24a of the baffle plate 24 is greater than the inner diameter D22 of the second flange 22. The outer diameter D24b of the baffle plate 24 is smaller than the inner diameter D21 of the first flange 21. The outer periphery of the baffle plate 24 is welded to the inner circumferential surface of the barrel 23.

Figure 4:
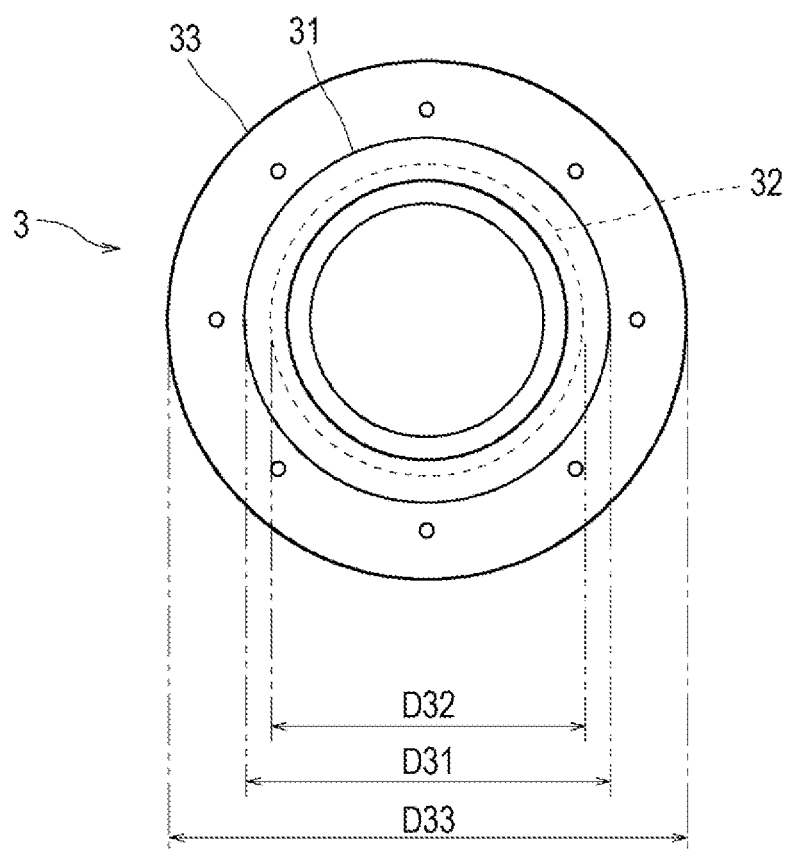
FIG. 4 shows an inner tube as viewed in the axial direction.

FIG. 4 shows the inner tube 3 as viewed in the axial direction X. As shown in FIGS. 2 and 4, the inner tube 3 is a metallic tubular body extending from its upstream end (third end) to its downstream end (fourth end) in the axial direction X. The inner tube 3 includes a third flange 31 located at the upstream end of the inner tube 3, a barrel 32 extending downward from the third flange 31, and a middle flange 33 located at a middle portion of the barrel 32 in the axial direction X. The middle flange 33 includes circumferentially arranged insertion holes. Bolts are inserted into the insertion holes.

The third flange 31 is connected to an outlet flange 77a located at the downstream end of the fixed pipe 77. The outer diameter D31 of the third flange 31 is smaller than the outer diameter of the outlet flange 77a. The third flange 31 is placed between retainers 25 and the outlet flange 77a, and the retainers 25, outlet flange 77a, and third flange 31 are fastened together by bolts inserted through the retainers 25 and the outlet flange 77a. The retainers 25 (the number of which is, for example, four) are arranged along the outer periphery of the third flange 31. Each of the retainers 25 is shaped as a segment of a ring, and the retainers 25 form the ring together. Each of the retainers 25 includes a cut at its upper inner periphery, and the third flange 31 is fitted in the cut. Thus, the third flange 31 of the inner tube 3 is restricted from moving relative to the outlet flange 77a of the fixed pipe 77 in the radial and up-down directions in the event that the point of connection between the fixed pipe 77 and the inner tube 3 is subjected to vibration. Each of the retainers 25 includes at least one insertion hole 25a for insertion of a bolt. Between the retainers 25 and the outlet flange 77a there is an upper gasket 36 that provides hermeticity.

The middle flange 33 protrudes radially outward from the outer circumferential surface of the barrel 32. The outer diameter D33 of the middle flange 33 is greater than the inner diameter D24a of the baffle plate 24 and smaller than the outer diameter D24b of the baffle plate 24. To improve the handleability of the inner tube 3, the outer diameter D31 of the third flange 31 is desirably smaller than the outer diameter D33 of the middle flange 33.

Figure 5:
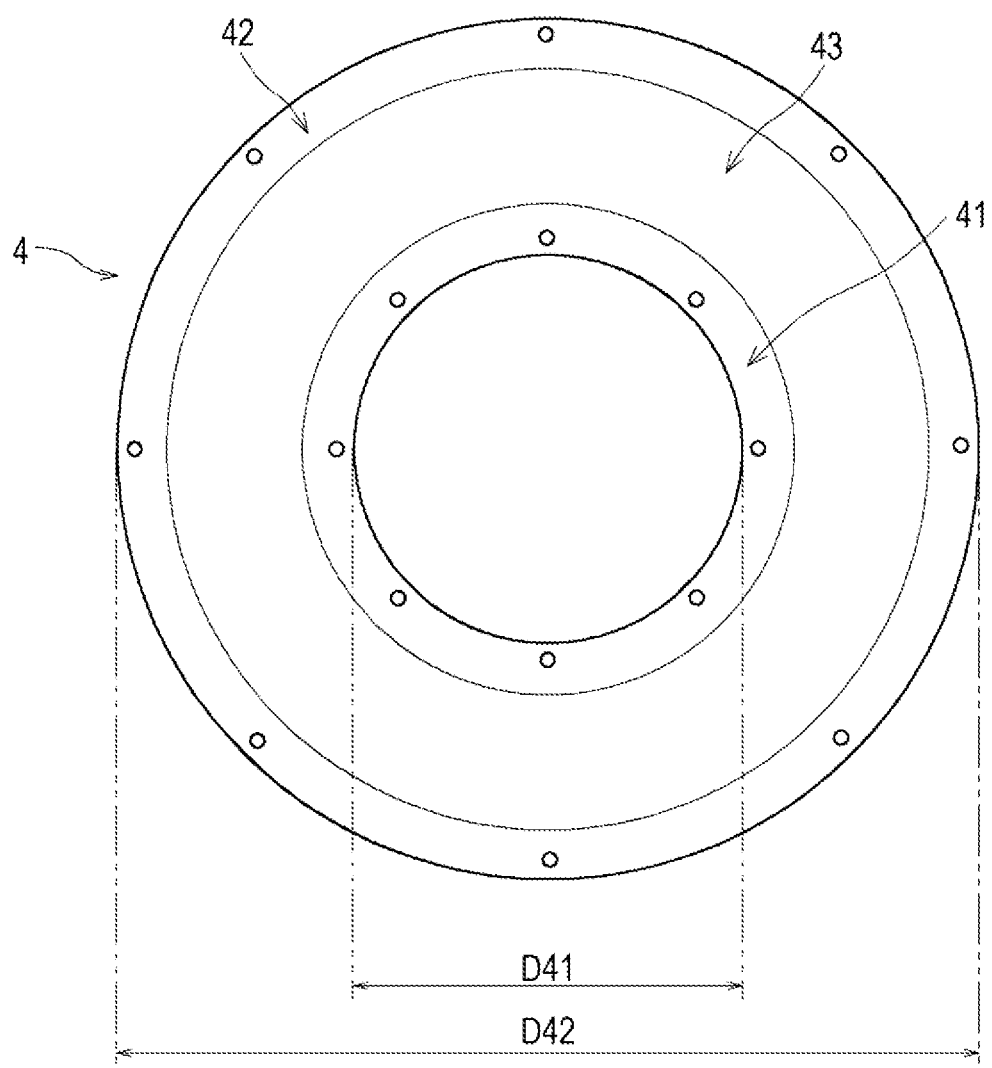
FIG. 5 shows a closure as viewed in the axial direction.

FIG. 5 shows the closure 4 as viewed in the axial direction X. As shown in FIGS. 2 and 5, the closure 4 is shaped as an annular disc. The closure 4 includes an inner peripheral portion 41, an outer peripheral portion 42, and an elastic portion 43 located between the inner peripheral portion 41 and the outer peripheral portion 42. Each of the inner and outer peripheral portions 41 and 42 includes circumferentially arranged insertion holes. Bolts are inserted into the insertion holes.

The inner diameter D41 of the closure 4 is greater than the outer diameter D32 of the barrel 32 of the inner tube 3 (i.e., the inner diameter of the middle flange 33) and smaller than the outer diameter D33 of the middle flange 33. The outer diameter D42 of the closure 4 is greater than the inner diameter D21 of the first flange 21 of the outer tube 2.

Figure 6:
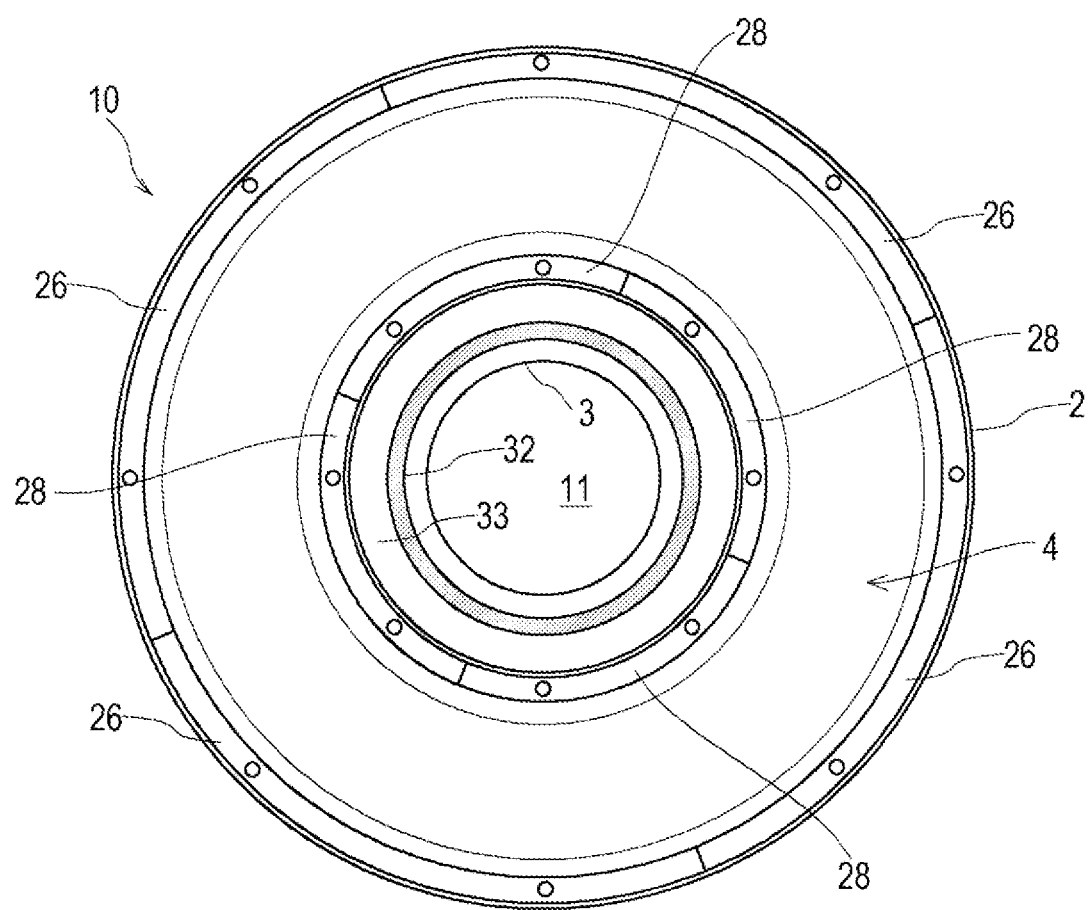
FIG. 6 is a view taken along the arrow VI-VI of FIG. 2.

FIG. 6 is a view taken along the arrow VI-VI of FIG. 2. As shown in FIGS. 2 and 6, the inner peripheral portion 41 of the closure 4 is connected to the middle flange 33 of the inner tube 3. The inner peripheral portion 41 is placed between the middle flange 33 of the inner tube 3 and retainers 28, and the retainers 28, inner peripheral portion 41, and middle flange 33 are fastened together by bolts inserted through the retainers 28, inner peripheral portion 41, and middle flange 33. The retainers 28 (the number of which is, for example, four) are arranged in a ring along the inner peripheral portion 41. Each of the retainers 28 is shaped as a segment of a ring, and the retainers 28 form the ring together.

The outer peripheral portion 42 of the closure 4 is connected to the first flange 21 of the outer tube 2. The outer peripheral portion 42 is placed between the first flange 21 of the outer tube 2 and retainers 26, and the retainers 26, outer peripheral portion 42, and first flange 21 are fastened together by bolts inserted through the retainers 26, outer peripheral portion 42, and first flange 21. The retainers 26 (the number of which is, for example, four) are arranged in a ring along the outer peripheral portion 42. Each of the retainers 26 is shaped as a segment of a ring, and the retainers 26 form the ring together.

The elastic portion 43 is expanded or contracted to absorb displacement of the outer peripheral portion 42 relative to the inner peripheral portion 41 in the axial direction X and the radial direction. The elastic portion 43 shown in FIG. 2 is made of rubber, resin, or fabric and includes one or more corrugations arranged in the radial direction. The elastic portion 43 is not limited to being corrugated. For example, the elastic portion 43 of the closure 4 may be shaped as a flat sheet insofar as the elastic portion 43 is made of elastic rubber or resin. In the case where the material to be transferred is hot, a heat-resistant material is desirably used for the elastic portion 43.

As shown in FIG. 2, for the expansion joint 10 configured as described above, the dimension of the outer tube 2 in the axial direction X is referred to as "outer tube height H2", the dimension of the inner tube 3 in the axial direction X is referred to as "inner tube height H3", the dimension of the inner tube 3 from its upstream end to the middle flange 33 in the axial direction X is referred to as "protrusion height H3a", the dimension of the closure 4 in the axial direction X is referred to as "closure height H4", and the dimension of the mounting region A in a direction parallel to the axial direction X is referred to as "mounting region height H0".

The outer tube height H2 is smaller than the mounting region height H0. The sum of the outer tube height H2 and the closure height H4 is desirably smaller than the mounting region height H0.

The inner tube height H3 is smaller than the mounting region height H0. The sum of the inner tube height H3 and the closure height H4 is desirably smaller than the mounting region height H0. The protrusion height H3a is desirably greater than the closure height H4.

The sum of the outer tube height H2, the protrusion height H3a, the thickness of the upper gasket 36, and the thickness of the lower gasket 37 is substantially equal to the mounting region height H0.

[How to Mount Expansion Joint 10]

The following describes how to mount the expansion joint 10. FIGS. 7 to 10 illustrate how to mount the expansion joint 10.

Figure 7:
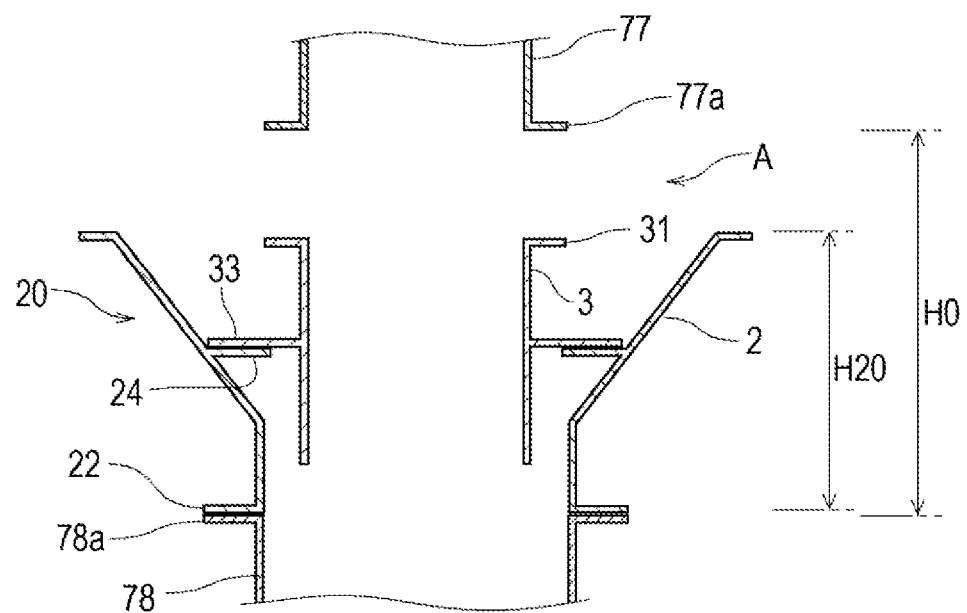
FIG. 7 illustrates how to mount the expansion joint.

First, as shown in FIG. 7, the outer tube 2 and the inner tube 3 are combined into an assembly 20. To construct the assembly 20, the inner tube 3 is inserted into the outer tube 2 from above. In the assembly 20, the upper surface of the baffle plate 24 of the outer tube 2 is in contact with the lower surface of the middle flange 33 of the inner tube 3. Thus, the inner tube 3 is stably supported by the outer tube 2 and restricted from moving downward relative to the outer tube 2.

The assembly 20 is placed into the mounting region A, and the second flange 22 of the outer tube 2 is placed onto the inlet flange 78a of the vibrating pipe 78. The dimension of the assembly 20 in the axial direction X is referred to as "assembly height H20". The assembly height H20 is smaller than the mounting region height H0 by approximately an extension amount H24 corresponding to the length from the baffle plate 24 to the first flange 21 in the axial direction X. As the assembly height H20 is smaller than the mounting region height H0, the assembly 20 can easily be brought into the mounting region A in a direction perpendicular to the axial direction X.

Figure 8:
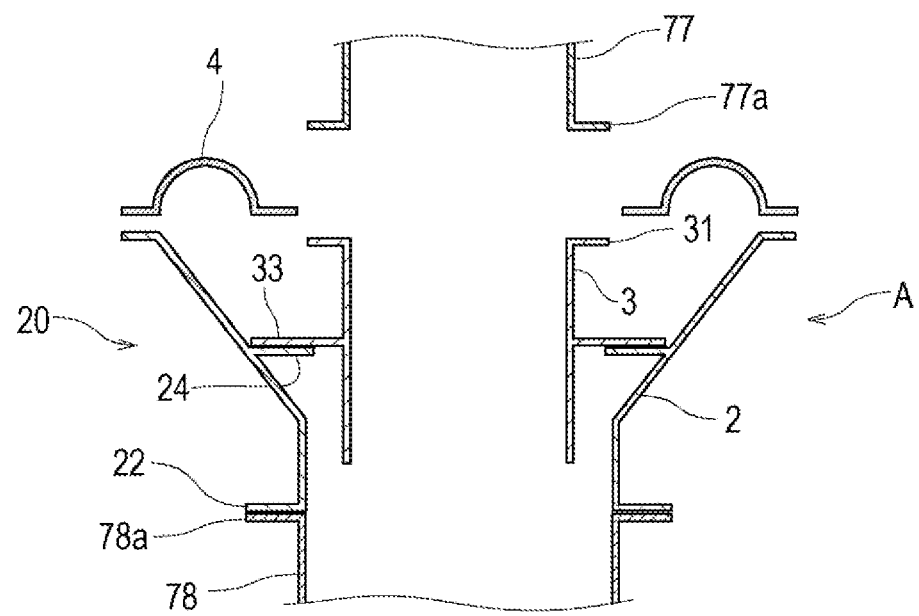
FIG. 8 illustrates how to mount the expansion joint.

Next, as shown in FIG. 8, the closure 4 is placed into the mounting region A. The sum of the assembly height H20 and the closure height H4 is desirably smaller than the mounting region height H0 so that the closure 4 can easily be brought into the mounting region A in a direction perpendicular to the axial direction X. As the closure 4 is elastically deformable, the size of the gap between the fixed pipe 77 and the assembly 20 may be slightly smaller than the closure height H4.

Figure 9:
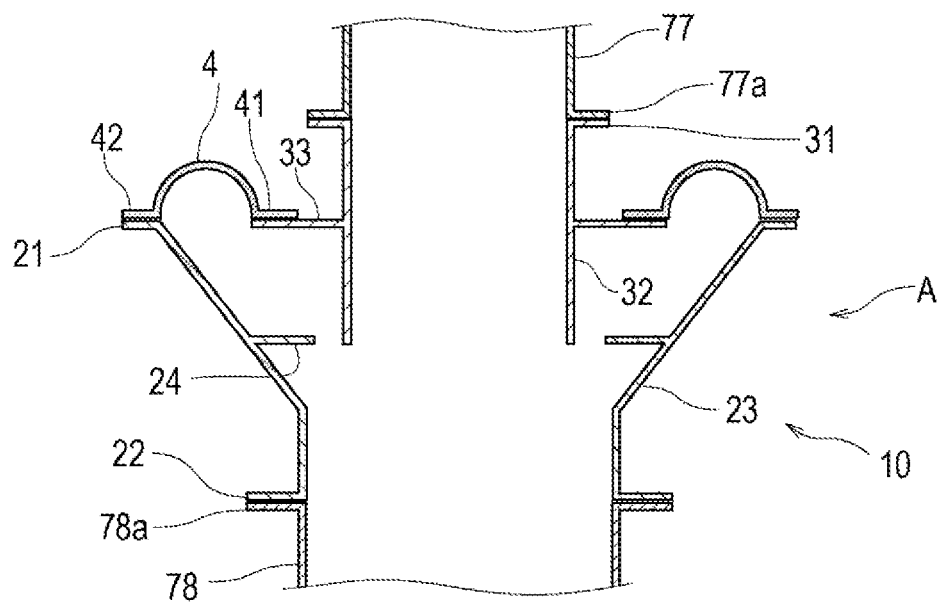
FIG. 9 illustrates how to mount the expansion joint.

Subsequently, as shown in FIG. 9, the inner tube 3 is raised a distance equal to the extension amount H24 relative to the outer tube 2 to bring the third flange 31 of the inner tube 3 into contact with the outlet flange 77a of the fixed pipe 77. As a result, the location of the middle flange 33 of the inner tube 3 in the axial direction X becomes approximately the same as the location of the first flange 21 of the outer tube 2 in the axial direction X.

Figure 10:
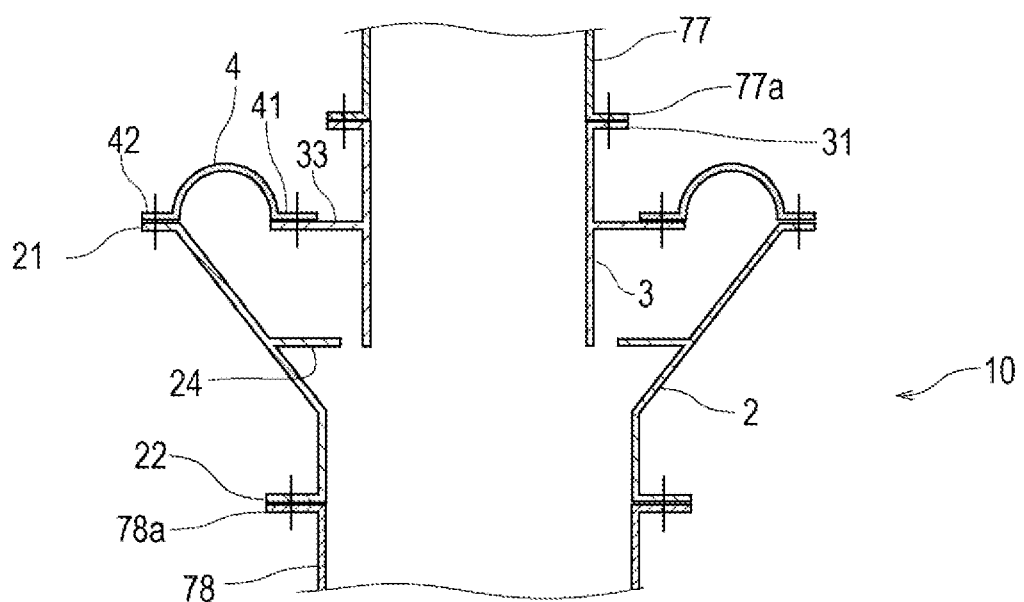
FIG. 10 illustrates how to mount the expansion joint.

Afterwards, as shown in FIG. 10, the outlet flange 77a of the fixed pipe 77 and the third flange 31 are fastened by bolts. The inlet flange 78a of the vibrating pipe 78 and the second flange 22 are fastened by bolts, the inner peripheral portion 41 of the closure 4 and the middle flange 33 are fastened by bolts, and the outer peripheral portion 42 of the closure 4 and the first flange 21 of the outer tube 2 are fastened by bolts. The bolt fastening may be performed at any time during the mounting work.

The expansion joint 10 can be removed by a reverse procedure to the mounting of the expansion joint 10. That is, the expansion joint 10 can be removed from the mounting region A by unfastening the bolts, lowering the inner tube 3 toward the outer tube 2, removing the closure 4 from the mounting region A, and removing the assembly 20 from the mounting region A.

As described above, incineration ash treatment equipment 7 according to an exemplary embodiment includes a grinder 75 serving as a vibrator that treats incineration ash, a pipe (a fixed pipe 77 serving as an upstream pipe) that delivers the incineration ash to the grinder 75, and an expansion joint 10 located between an outlet of the pipe and an inlet of the grinder 75 (or a vibrating pipe 78 serving as a downstream pipe). The expansion joint 10 absorbs displacement occurring at a point of connection between the upstream and downstream pipes 77 and 78 through which a powdery and/or granular material is transferred by gravity. The expansion joint 10 includes an outer tube 2, an inner tube 3 located inside the outer tube 2, and a closure 4 closing a gap between the outer tube 2 and the inner tube 3. The outer tube 2 includes opposite first and second ends (upstream and downstream ends) and extends from the first end to the second end in an axial direction X of the expansion joint 10. The outer tube 2 further includes a first flange 21 and a second flange 22, the first flange 21 being located at the first end, the second flange 22 being located at the second end and connectable to the downstream pipe. The inner tube 3 includes opposite third and fourth ends (upstream and downstream ends) and extends from the third end to the fourth end in the axial direction X. The inner tube 3 further includes a third flange 31 and a middle flange 33, the third flange 31 being located at the third end and connectable to the upstream pipe, the middle flange 33 being located at a middle portion between the third and fourth ends. The closure 4 includes an outer peripheral portion 42 connected to the first flange 21, an inner peripheral portion 41 connected to the middle flange 33, and an elastic portion 43 connecting the outer peripheral portion 42 to the inner peripheral portion 41.

In the expansion joint 10 according to the above embodiment, the first flange 21 of the outer tube 2 secured to the downstream pipe 78 and the middle flange 33 of the inner tube 3 secured to the upstream pipe 77 are at the same location in the axial direction X. The statement that "the first flange 21 and the middle flange 33 are at the same location in the axial direction X" is intended to include not only the case where the location of the first flange 21 in the axial direction X and the location of the middle flange 33 in the axial direction X are exactly the same, but also the case where the distance between the locations of the first flange 21 and the middle flange 33 in the axial direction X is equal to or below a threshold. For example, the threshold is equal to, and desirably smaller than, the dimension of the closure 4 in the axial direction X (i.e., the closure height H4).

The present disclosure is not limited to the expansion joint 10 in which the first flange 21 of the outer tube 2 secured to the downstream pipe 78 and the middle flange 33 of the inner tube 3 secured to the upstream pipe 77 are at the same location in the axial direction X. In the expansion joint 10, the first end (upstream end) of the outer tube 2 may be spaced from the third end (upstream end) of the inner tube 3 in the axial direction X and located between the third end and the fourth end (downstream end) of the inner tube 3 in the axial direction X.

In the expansion joint 10 and incineration ash treatment equipment 7 configured as described above, the middle flange 33, to which the closure 4 is attached, is spaced from the fourth end of the inner tube 3 in the axial direction X. Thus, the downstream end of the inner tube 3 and the closure 4 can be spaced a distance corresponding to the distance between the downstream end and middle flange 33 of the inner tube 3 in the axial direction X. This can reduce the likelihood that the transferred material entering the gap between the inner tube 3 and the outer tube 2 from the downstream end of the inner tube 3 comes into contact with the closure 4.

In the expansion joint 10 and incineration ash treatment equipment 7 configured as described above, the first flange 21 located at the first end of the outer tube 2 and the third flange 31 located at the third end of the inner tube 3 and connected to the upstream pipe 77 are spaced from each other in the axial direction X. The space between the first flange 21 and the third flange 31 in the axial direction X can be used as a workspace for connection (or disconnection) of the third flange 31 and the upstream pipe 77. Despite the first flange 21 being located radially outside the third flange 31, the work of connecting the third flange 31 and the upstream pipe 77 is not disturbed by the first flange 21. Thus, connection and disconnection of the expansion joint 10 and the upstream pipe 77 can easily be performed.

In the expansion joint 10 and incineration ash treatment equipment 7 configured as described above, the third end (upstream end) of the inner tube 3 connected to the upstream pipe 77 and the first end (upstream end) of the outer tube 2 connected to the downstream pipe 78 are spaced from each other in the axial direction X. Thus, the dimension of the outer tube 2 in the axial direction X (outer tube height H2) is smaller than the vertical dimension of the mounting region A extending between the upstream pipe 77 and the downstream pipe 78 (mounting region height H0). As such, the outer tube 2 with the inner tube 3 inserted therein (i.e., the assembly 20) can easily be carried into the mounting region A. After the assembly 20 constructed of the inner tube 3 and the outer tube 2 is placed in the mounting region A, the closure 4 can be carried into the mounting region A by utilizing a gap extending downward from the upstream pipe 77 and having a size corresponding to the extension amount H24. Additionally, the space between the third flange 31 connected to the upstream pipe 77 and the middle flange 33 can be used as a workspace for attachment (or detachment) of the closure 4. Thus, attachment and detachment of the closure 4 are easy, and this is advantageous not only in mounting/removing work but also in maintenance work in which only the closure 4 is replaced by a new one.

In the expansion joint 10 and incineration ash treatment equipment 7 according to the above embodiment, the downstream end of the inner tube 3 and the closure 4 are far enough from each other to avoid contact between the transferred material and the closure 4. The expansion joint 10 serves the same function as the conventional expansion joint disclosed in Patent Literature 1 and is easier to mount and remove than the conventional expansion joint.

In the expansion joint 10 according to the above embodiment, the outer diameter D33 of the middle flange 33 is greater than the inner diameter D22 of the second flange 22 and smaller than the inner diameter D21 of the first flange 21.

Thus, the inner tube 3 is stably supported by the outer tube 2 in the assembly 20 constructed by inserting the inner tube 3 into the outer tube 2.

In the expansion joint 10 according to the above embodiment, the outer tube 2 includes a baffle plate 24 shaped as an annular disc that projects radially from an inner circumferential surface of the outer tube 2. Although the baffle plate 24 according to the above embodiment is shaped as an annular disc that is circumferentially continuous, the baffle plate 24 may be shaped as an annular disc that is circumferentially discontinuous.

The baffle plate 24 serves to prevent the transferred material from reaching the closure 4 through the gap between the outer tube 2 and the inner tube 3. This can reduce the likelihood of contact between the transferred material and the closure 4.

In the above expansion joint 10, the baffle plate 24 is located between the middle flange 33 and the second flange 22 in the axial direction X, and the outer diameter of the middle flange 33 is greater than the inner diameter of the baffle plate 24 and smaller than the outer diameter of the baffle plate 24.

Thus, in the assembly 20 constructed by inserting the inner tube 3 into the outer tube 2, the middle flange 33 is in contact with, and supported by, the baffle plate 24. As such, the inner tube 3 is stably supported by the outer tube 2.

The expansion joint 10 according to the above embodiment further includes first retainers 25 arranged circumferentially along an outer periphery of the third flange 31 to hold the third flange 31 between the upstream pipe 77 and the first retainers. Each of the first retainers 25 includes at least one insertion hole 25a for insertion of a bolt.

The insertion holes through which bolts are inserted to connect the third flange 31 to the outlet flange 77a of the upstream pipe 77 are included in the first retainers 25, rather than the third flange 31. This eliminates the need to adjust the rotational position of the inner tube 3 to align the outlet flange 77a and the third flange 31. Additionally, each of the first retainer 25 is not shaped as a circular ring but a segment of a circular ring, and thus the first retainers 25 can be arranged around the third flange 31 without having to pass the inner tube 3 through the central opening of the circular ring formed by the first retainers 25. As such, mounting and removal of the expansion joint 10 are simplified.

The expansion joint 10 according to the above embodiment further includes second retainers 28 arranged circumferentially along the inner peripheral portion 41 of the closure 4 to hold the inner peripheral portion 41 between the middle flange 33 and the second retainers 28. The expansion joint 10 according to the above embodiment further includes third retainers 26 arranged circumferentially along the outer peripheral portion 42 of the closure 4 to hold the outer peripheral portion 42 between the first flange 21 and the third retainers 26.

Each of the second retainers 28 and the third retainers 26 is not shaped as a circular ring but a segment of a circular ring. Thus, the second retainers 28 can be arranged along the inner peripheral portion 41 of the closure 4 without having to pass the outer tube 2, inner tube 3, and closure 4 through the central opening of the circular ring formed by the second retainers 28. The third retainers 26 can be arranged along the outer peripheral portion 42 of the closure 4 without having to pass the outer tube 2, inner tube 3, and closure 4 through the central opening of the circular ring formed by the third retainers 26.

Although the foregoing has described a preferred embodiment of the present disclosure, the scope of the present disclosure embraces modifications made to the details of the structure and/or function of the above embodiment without departing from the gist of the present disclosure.

For example, although the outer tube 2 of the expansion joint 10 according to the above embodiment includes the baffle plate 24, the baffle plate 24 is not essential and may be omitted.

Figure 11:
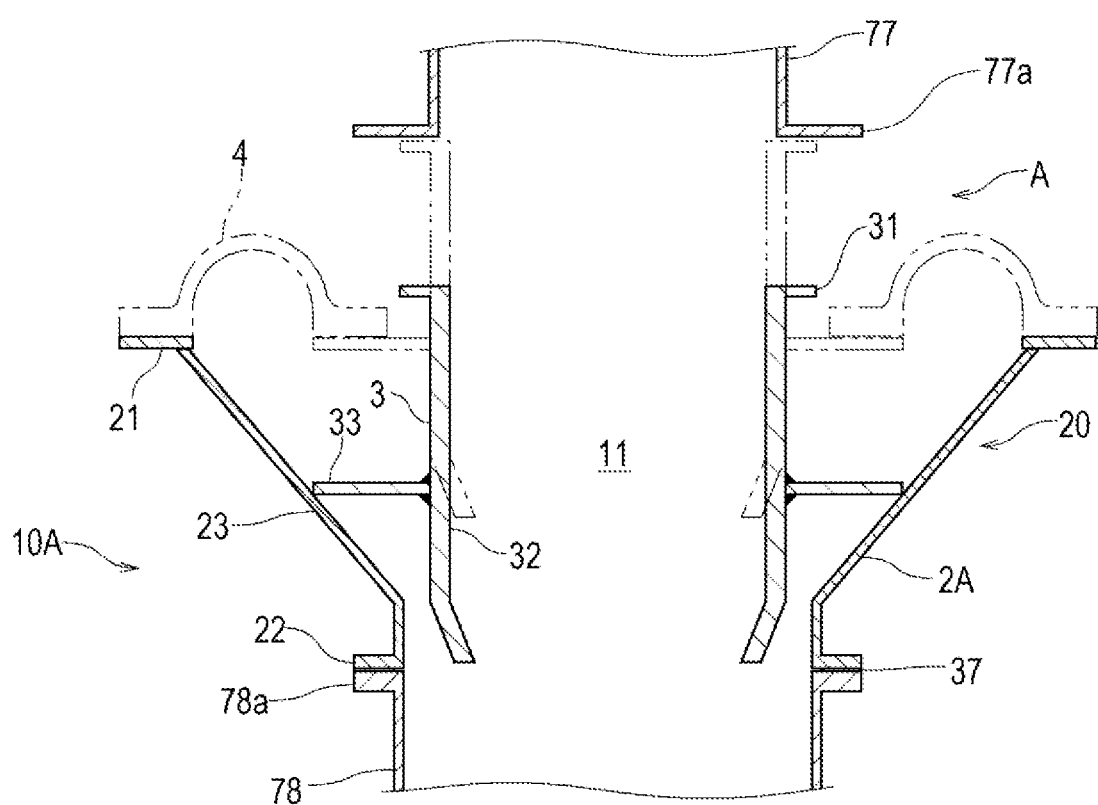
FIG. 11 shows an expansion joint according to a first variant and is an end view of the expansion joint cut along a plane including the central axis of the expansion joint.

FIG. 11 shows an expansion joint 10A according to a first variant and is an end view of the expansion joint 10A cut along a plane including the central axis of the expansion joint 10A. The expansion joint 10A of FIG. 11 includes an outer tube 2A, which is devoid of the baffle plate 24. In the assembly 20 constructed of the outer tube 2A and the inner tube 3, the middle flange 33 of the inner tube 3 is in contact with the inner circumferential surface of the barrel 23 of the outer tube 2A. Thus, the inner tube 3 is supported by the outer tube 2A and restricted from moving downward relative to the outer tube 2A. Despite the absence of the baffle plate 24, the likelihood of contact between the transferred material and the closure 4 can be reduced since the closure 4 is maximally far from a point where the transferred material enters the gap between the inner tube 3 and the outer tube 2A.

Figure 12:
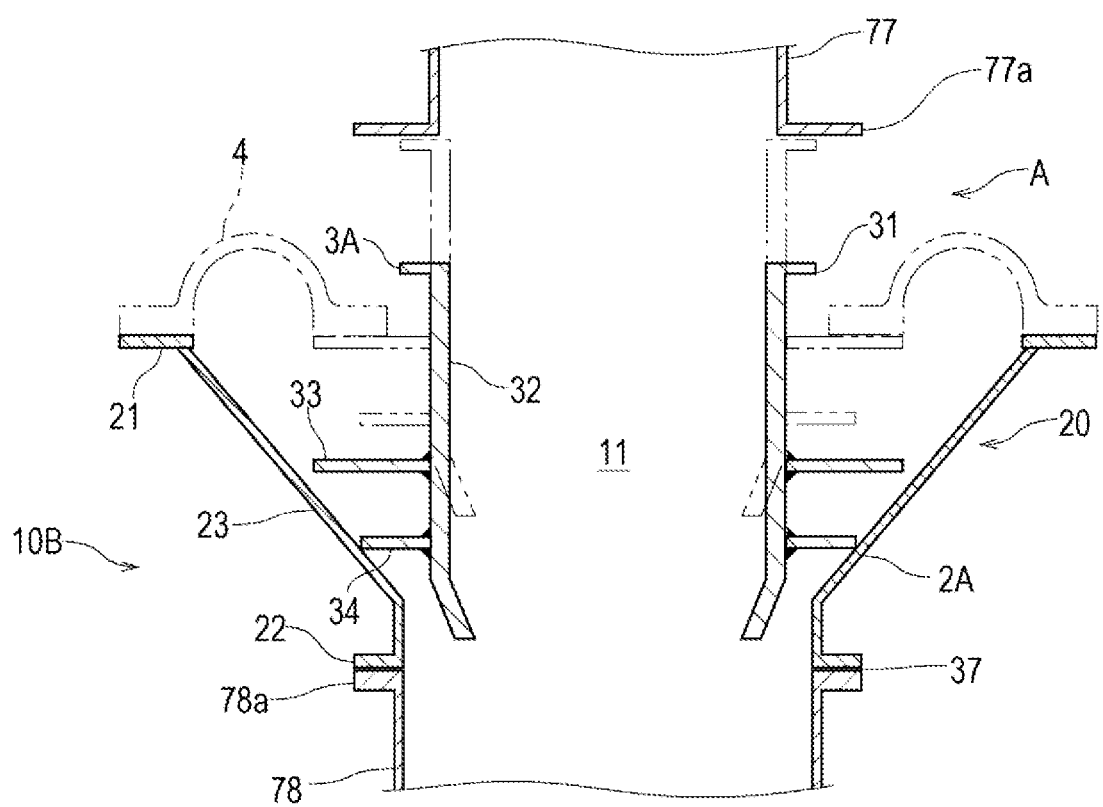
FIG. 12 shows an expansion joint according to a second variant and is an end view of the expansion joint cut along a plane including the central axis of the expansion joint.

FIG. 12 shows an expansion joint 10B according to a second variant and is an end view of the expansion joint 10B cut along a plane including the central axis of the expansion joint 10B. The expansion joint 10B of the FIG. 12 includes an outer tube 2A, which is devoid of the baffle plate 24. The expansion joint 10B includes an inner tube 3A including a lower flange 34 located below the middle flange 33. The lower flange 34 protrudes radially outward from the outer circumferential surface of the barrel 32. The outer diameter of the lower flange 34 is smaller than the outer diameter D33 of the middle flange 33. In the assembly 20 constructed of the outer tube 2A and the inner tube 3A, the lower flange 34 of the inner tube 3A is in contact with the inner circumferential surface of the barrel 23 of the outer tube 2A. Thus, the inner tube 3A is supported by the outer tube 2A and restricted from moving downward relative to the outer tube 2A. Despite the absence of the baffle plate 24, the likelihood of contact between the transferred material and the closure 4 can be reduced since the lower flange 34 serves to prevent the transferred material from entering the gap between the inner tube 3A and the outer tube 2A.

INDUSTRIAL APPLICABILITY

The expansion joint according to the present disclosure is not limited to the embodiments described above, and can be widely used as an expansion unit included in a piping system through which a powdery or granular material is transferred, in particular as an expansion unit that is located at a point of connection of pipes in a region where the material is transferred by gravity and that absorbs displacement between the connected pipes.

The invention claimed is:

1. An expansion joint that absorbs displacement occurring at a point of connection between upstream and downstream pipes through which a powdery and/or granular material is transferred by gravity, the expansion joint comprising:
    an outer tube including opposite first and second ends and extending from the first end to the second end in an axial direction of the expansion joint, the outer tube further including a first flange and a second flange, the first flange being located at the first end, the second flange being located at the second end and connectable to the downstream pipe;
    an inner tube including opposite third and fourth ends and extending from the third end to the fourth end in the axial direction, the inner tube being located inside the outer tube and further including a third flange and a middle flange, the third flange being located at the third end and connectable to the upstream pipe, the middle flange being located at a middle portion between the third and fourth ends; and
    a closure including an outer peripheral portion connected to the first flange, an inner peripheral portion connected to the middle flange, and an elastic portion connecting the outer peripheral portion to the inner peripheral portion, wherein
    the first end is spaced from the third end in the axial direction and located between the third and fourth ends in the axial direction,
    the first flange and the middle flange are at the same location in the axial direction, and
    an outer diameter of the middle flange is greater than an inner diameter of the second flange and smaller than an inner diameter of the first flange.

2. The expansion joint according to claim 1, wherein the outer tube includes a baffle plate shaped as an annular disc that projects radially from an inner circumferential surface of the outer tube.

3. The expansion joint according to claim 1, further comprising first retainers arranged circumferentially along an outer periphery of the third flange to hold the third flange between the upstream pipe and the first retainers, wherein each of the first retainers includes at least one insertion hole for insertion of a bolt.

4. The expansion joint according to claim 1, further comprising second retainers arranged circumferentially along the inner peripheral portion of the closure to hold the inner peripheral portion between the middle flange and the second retainers.

5. The expansion joint according to claim 1, further comprising third retainers arranged circumferentially along the outer peripheral portion of the closure to hold the outer peripheral portion between the first flange and the third retainers.

6. Incineration ash treatment equipment comprising:
    a vibrator that treats incineration ash;
    a pipe that delivers the incineration ash to the vibrator; and
    the expansion joint according to claim 1, the expansion joint being located between an outlet of the pipe and an inlet of the vibrator.

* * * * *